United States Patent
Yu et al.

(10) Patent No.: US 11,924,132 B2
(45) Date of Patent: *Mar. 5, 2024

(54) METHODS OF FREQUENCY DOMAIN INTRA-ORTHOGONAL FREQUENCY-DIVISION MULTIPLEXING (OFDM) SYMBOL MULTI Rx-BEAM MEASUREMENT AND DYNAMIC Rx BEAM SWEEPING

(71) Applicant: Apple Inc., Cupertino, CA (US)

(72) Inventors: Zhibin Yu, Unterhaching (DE); Michael Ruder, Pommelsbrunn (DE); Holger Neuhaus, Munich (DE); Yeong-Sun Hwang, Oberhaching (DE); Bertram Gunzelmann, Koenigsbrunn (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,012

(22) Filed: Oct. 3, 2022

(65) Prior Publication Data
US 2023/0101423 A1 Mar. 30, 2023

Related U.S. Application Data

(63) Continuation of application No. 16/768,460, filed as application No. PCT/CN2017/119942 on Dec. 29, 2017, now Pat. No. 11,463,212.

(51) Int. Cl.
*H04W 72/04* (2023.01)
*H04B 7/06* (2006.01)
(Continued)

(52) U.S. Cl.
CPC ......... *H04L 5/0048* (2013.01); *H04B 7/0814* (2013.01); *H04B 7/088* (2013.01); *H04L 25/03261* (2013.01)

(58) Field of Classification Search
CPC ...... H04B 7/08; H04B 7/0695; H04B 7/0814; H04B 7/088; H04L 5/0048;
(Continued)

(56) References Cited

U.S. PATENT DOCUMENTS 9,264,320 B1* 2/2016 Shevenell ........... H04L 47/6235
10,348,526 B2 7/2019 Hessler
(Continued)

FOREIGN PATENT DOCUMENTS

CN 107408964 11/2017
WO 2016141975 9/2016
(Continued)

OTHER PUBLICATIONS

Ericsson, "CSI-RS for beam management," 3GPP Draft; R1-1711042 CSI-RS for beam management, 3rd Generation Partnership Project (3GPP), Mobile Competence Centre; 650, Route Des Lucioles; F-06921 Sophia-Antipolis Cedex; France [hereinafter referred to as Ericsson/R1-1711042] (Year: 2017).*

(Continued)

*Primary Examiner* — Sithu Ko
*Assistant Examiner* — Vanneilian Lalchinthang
(74) *Attorney, Agent, or Firm* — Kowert, Hood, Munyon, Rankin & Goetzel, P.C.

(57) ABSTRACT

A communication device comprises a receiver including at least two receive antennas and configured to receive at least one reference signal of a plurality of reference signals, each reference signal being transmitted from at least one base station at a predefined reference signal transmission time; a controller configured to switch between at least two receive configurations of the at least two antennas during a reception period of the at least one reference signal; and a signal quality determiner configured to determine a parameter
(Continued)

indicative of a first signal quality of the received reference signal for each receive configuration.

20 Claims, 10 Drawing Sheets

(51) Int. Cl.
*H04B 7/08* (2006.01)
*H04L 5/00* (2006.01)
*H04L 25/03* (2006.01)

(58) Field of Classification Search
CPC .......... H04L 25/03261; H04L 5/0053; H04W 36/0055; H04W 72/046; H04W 72/542
USPC ......................................................... 370/329
See application file for complete search history.

(56) References Cited

U.S. PATENT DOCUMENTS

| | | | |
|---|---|---|---|
| 2006/0029233 A1* | 2/2006 | Sommerfeldt ... | G10K 11/17857 381/71.7 |
| 2015/0010099 A1* | 1/2015 | Lin ..................... | H04B 7/0404 375/267 |
| 2015/0079912 A1* | 3/2015 | Dehos ................... | H04B 1/408 455/76 |
| 2016/0006489 A1* | 1/2016 | Rydström ............ | H04B 7/0413 375/267 |
| 2016/0254938 A1* | 9/2016 | Davydov .............. | H04L 1/1812 370/336 |
| 2017/0111886 A1* | 4/2017 | Kim ....................... | H04W 48/14 |
| 2017/0264415 A1* | 9/2017 | Wiberg ................. | H04W 72/02 |
| 2017/0276398 A1* | 9/2017 | Hanazono ........ | G10K 11/17825 |
| 2017/0339674 A1* | 11/2017 | Hoshino ............... | H04W 24/10 |
| 2018/0262313 A1* | 9/2018 | Nam .................... | H04L 5/0044 |
| 2019/0058558 A1* | 2/2019 | Lee ..................... | H04W 72/044 |
| 2021/0204265 A1* | 7/2021 | Hakola ................ | H04B 7/0695 |

FOREIGN PATENT DOCUMENTS

| | | |
|---|---|---|
| WO | 2017067794 | 10/2016 |
| WO | 2017065548 | 4/2017 |
| WO | 2017078413 | 5/2017 |

OTHER PUBLICATIONS

Written Opinion of the International Searching Authority, PCT/CN2017/119942, dated Oct. 8, 2018, four pages.
Ericsson; "CSI-RS for beam management"; 3GPP TSG-RAN WG1 #89ah-NR; R1-1711042; Qingdao, China; Jun. 27, 2017; 8 Pages.
Partial Supplementary European Search Report for Patent Application No. 17936901.2; dated Oct. 6, 2020; 13 Pages.
Search Report for Chinese Patent Application No. 2017800971981; 4 pages; dated May 18, 2022.

* cited by examiner

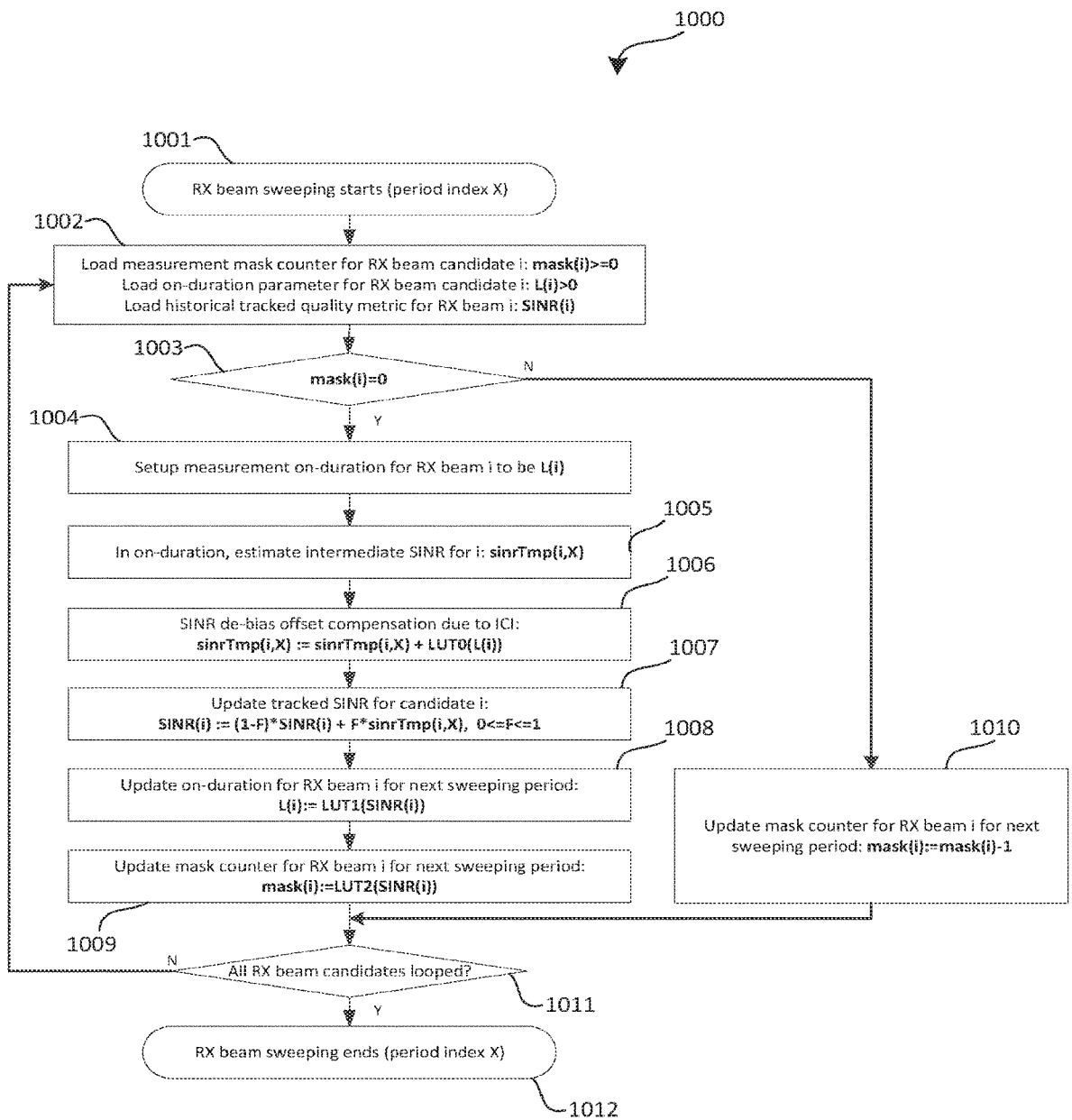

METHODS OF FREQUENCY DOMAIN INTRA-ORTHOGONAL FREQUENCY-DIVISION MULTIPLEXING (OFDM) SYMBOL MULTI Rx-BEAM MEASUREMENT AND DYNAMIC Rx BEAM SWEEPING

PRIORITY CLAIM INFORMATION

This application is a continuation of U.S. patent application Ser. No. 16/768,460, entitled "Methods of Frequency Domain Intra-Orthogonal Frequency-Division Multiplexing (OFDM) Symbol Multi Rx-Beam Measurement and Dynamic Rx Beam Sweeping," filed May 29, 2020, which is a national phase entry of PCT application number PCT/CN2017/119942, entitled "Methods of Frequency Domain Intra-Orthogonal Frequency-Division Multiplexing (OFDM) Symbol Multi Rx-Beam Measurement and Dynamic Rx Beam Sweeping," filed Dec. 29, 2017, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Various embodiments relate generally to methods and devices for improving signal reception.

BACKGROUND

Beam management (BM) may be an important feature for radio communication systems (e.g., LTE, UMTS, GSM, other 3rd Generation Partnership Project (3GPP) networks, WLAN/WiFi, Bluetooth, 5G, mmWave, etc.). In such communication systems, a communication device and a corresponding base station may perform measurements of reference signals using multiple transmit-receive beam pair candidates and may select a pair based on measured signal quality values for respectively measured reference signals. Beam sweeping may be one sub-functionality of BM where a communication device may change receive beams, e.g. receive configurations of an antenna array during a reception period of reference signals, measure a reception quality and identify a best receive beam configuration based on the measurements. In various communication systems, reference signals may be sparsely allocated in each of a predefined group of OFDM symbols.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 10 shows a further exemplary method which a communication device may perform using the components of FIG. 6.

DESCRIPTION

Figure 1:
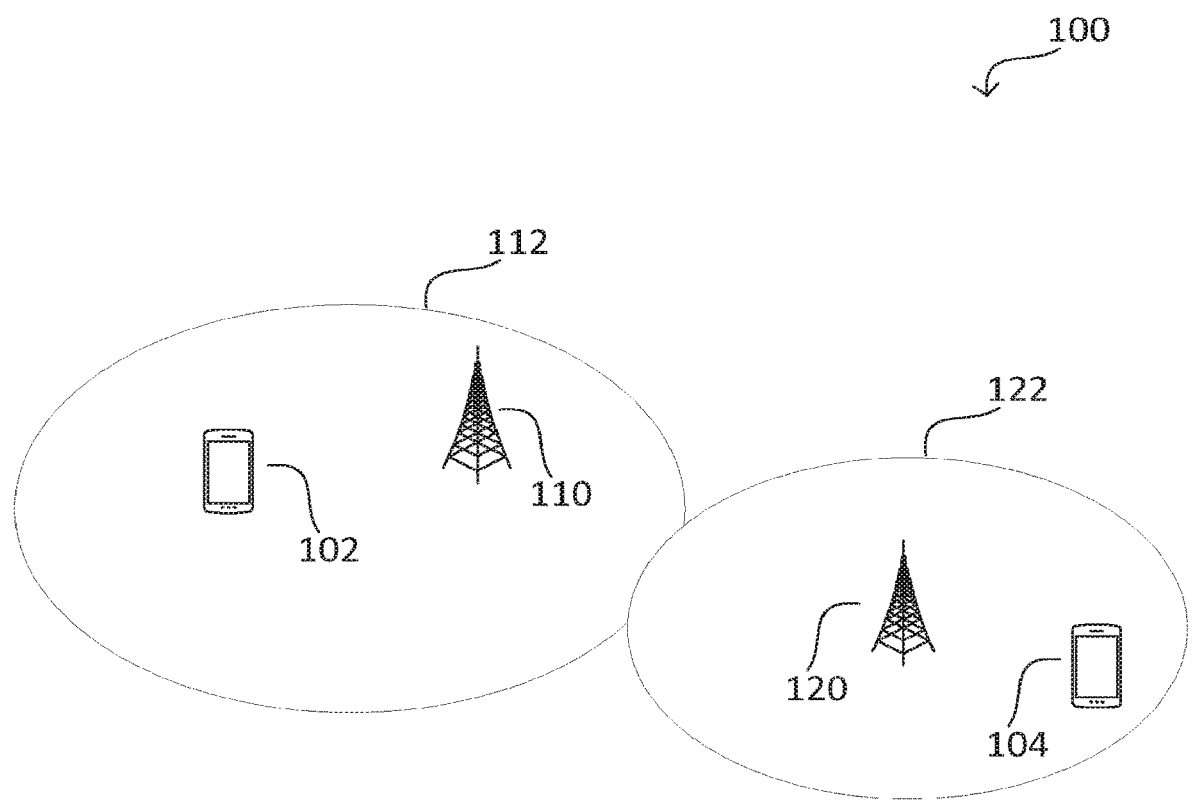
FIG. 1 shows an exemplary communication network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set (of)", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The terms "communication device" and "terminal device" utilized herein refers to user-side devices (both mobile and immobile) that can connect to a core network and various external networks via a radio access network. The term "network access node" as utilized herein refers to a network-side device that provides a radio access network with which communication devices can connect and exchange information with other networks through the network access node. The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc. The terms "user equipment", "UE", "communication device", "terminal device", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PIT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC). Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

Aspects described herein can be used on various different types of spectrum, including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In addition or alternatively, in various aspects, any of the radio links described herein may operate according to any one or more of the following radio communication technologies and/or standards including but not limited to: 3GPP NR, and/or 5G using corresponding frequency bands including but not limited to the group including 24.25-27.5 GHz, 31.8-33.4 GHz, 37-40.5 GHz, 40.5-42.5 GHz, 45.5-50.2 GHz, 50.4-52.6 GHz, 66-76 GHz, 81-86 GHz and any combination thereof. In various aspects, in addition or alternatively to OFDM, communication systems may employ IFDMA.

For purposes of this disclosure, radio communication technologies may be classified as one of a Short Range radio communication technology or Cellular Wide Area radio communication technology. Short Range radio communication technologies include Bluetooth, WLAN (e.g. according to any IEEE 802.11 standard), and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g. according to an IEEE 802.16 radio communication standard, e.g. WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples. Furthermore, as used herein the term GSM refers to both circuit- and packet-switched GSM, i.e. including GPRS, EDGE, and any other related GSM technologies. Likewise, the term UMTS refers to both circuit- and packet-switched GSM, i.e. including HSPA, HSDPA/HSUPA, HSDPA+/HSUPA+, and any other related UMTS technologies.

The term "network" as utilized herein, e.g. in reference to a communication network such as a radio communication network, encompasses both an access section of a network (e.g. a radio access network (RAN) section) and a core section of a network (e.g. a core network section). The term "radio idle mode" or "radio idle state" used herein in reference to a communication device refers to a radio control state in which the communication device is not allocated at least one dedicated communication channel of a mobile communication network. The term "radio connected mode" or "radio connected state" used in reference to a communication device refers to a radio control state in which the communication device is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

FIG. 1 shows communication network 100, which may include communication devices 102 and 104 in addition to network access nodes 110 and 120. Communication network 100 may communicate via network access nodes 110 and 120 with communication devices 102 and 104 via various mechanisms. In some aspects, communication network 100 may be an ad-hoc network, which may be self-organizing, i.e., the ad-hoc network may be composed of devices that are not pre-configured to have certain roles. A device may be an apparatus capable of communicating via the communication means of communication network 100. Any device may independently become part of communication network 100, such as via self-configuration and/or registration with other devices. Thus, in some aspects communication network 100 may not have a fixed set of devices. In some aspects, the ad-hoc network may be composed of heterogeneous devices or homogenous devices. Homogeneous devices may all have the same properties, such as computational power, communication rate, communication technologies, etc. Heterogeneous devices on the other hand, may have varying properties. Communications between devices in the ad-hoc network may be able to communicate directly to one another, e.g., peer-to-peer, or may be synchronized to forward communications via other devices to a targeted device, e.g., peer-to-remote.

The ad-hoc network may include a hierarchy or a system in which one or more devices, for example, network access nodes 110 and 120, may direct other devices in communication network 100 to transmit communications. The hierarchy of devices may be based on computational power. For example, devices with a higher computational power than other devices may be assigned a higher hierarchy, and may thus direct the communications of lower hierarchy devices, such as to direct communication forwarding more efficiently.

In some aspects, communication network 100 can use a sound wave access network. Devices, e.g., network access nodes 110 and 120, as well as communication devices 102 and 104, may utilize transducers, e.g., including a diaphragm, to convert electrical signals into physical sound waves that propagate through a medium, such as air. The sound waves may be in an ultrasonic frequency and may be modulated to convey communications between devices.

In some aspects, communication network 100 can use an optical access network. Devices, such as network access nodes 110 and 120 and/or communication devices 102 and 104, may utilize electromagnetic radiation in, for example, the visible light spectrum, infrared spectrum, and/or ultraviolet spectrum to convey communications between devices. Communications may be effected between a light source and a light-sensitive sensor.

In some aspects, communication network 100 can use a radio access network, which may herein be referred to as radio communication network 100. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be analogously applied mutatis mutandis to any other type or configuration of radio access network. The number of network access nodes and communication devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while communication devices 102 and 104 may be cellular communication devices (e.g., Mobile Stations (MSs), User Equipments (UEs), or any type of cellular communication device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while communication devices 102 and 104 may be short range communication devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to communication devices 102 and 104 (and, optionally, other communication devices of radio communication network 100 not explicitly shown in FIG. 1). In an exemplary cellular context, the radio access network provided by network access nodes 110 and 120 may enable communication devices 102 and 104 to wirelessly access the core network via radio communications. The core network may provide switching, routing, and transmission, for traffic data related to communication devices 102 and 104, and may further provide access to various internal data networks (e.g., control nodes, routing nodes that transfer information between other communication devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between communication devices connected to radio communication network 100) and external data networks (e.g., data networks providing voice, text, multimedia (audio, video, image), and other Internet and application data).

The radio access network and core network (if applicable, e.g. for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, communication devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include 5G/NR, LTE, UMTS, GSM, WiMAX, Bluetooth, WiFi, mmWave, etc., any of which may be applicable to radio communication network 100.

Figure 2:
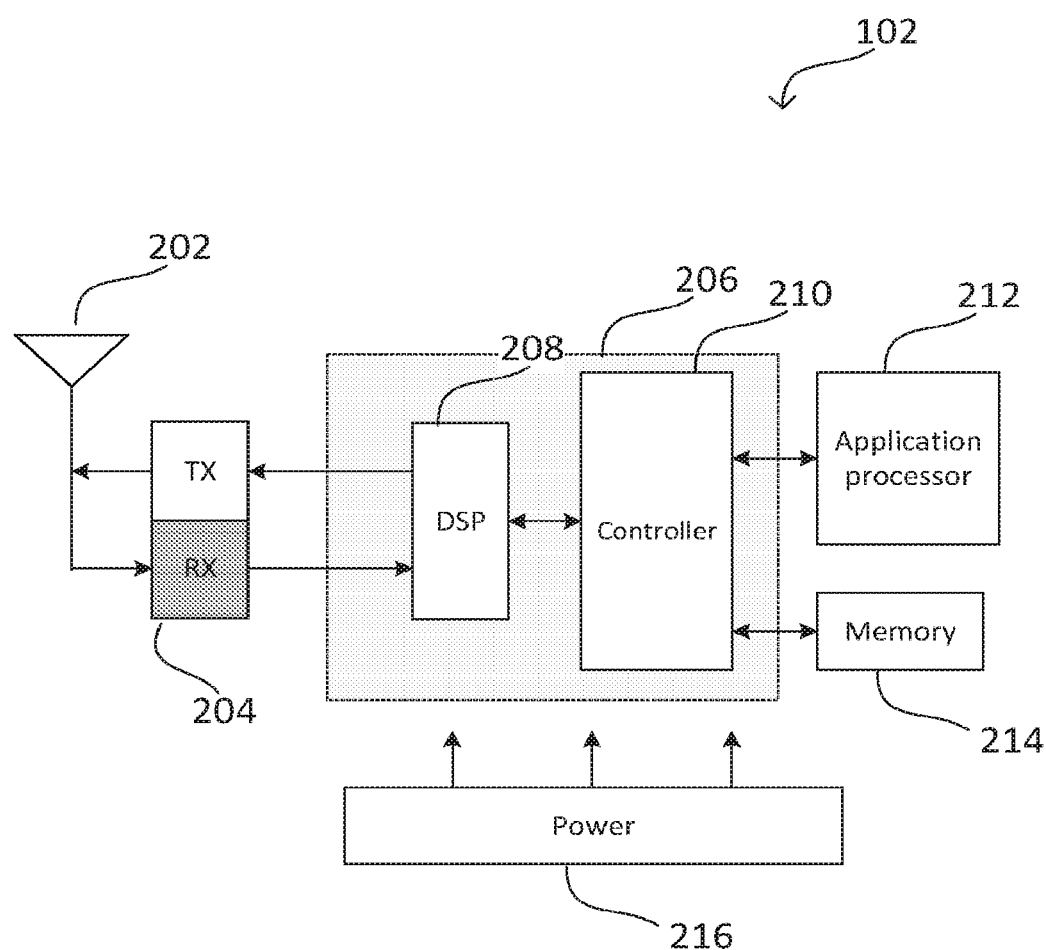
FIG. 2 shows an exemplary internal configuration of a communication device according to some aspects.

FIG. 2 shows an internal configuration of communication device 102, which may include antenna system 202, radio frequency (RF) transceiver 204, baseband modem 206 (including digital signal processing subsystem 208 and controller 210), application processor 212, memory 214, and power supply 216. Although not explicitly shown in FIG. 2, communication device 102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identity module(s) (SIMs), user input/output devices (display(s), keypad(s), touchscreen(s), speaker(s), external button(s), camera(s), microphone(s), etc.), etc.

In an abridged operational overview, communication device 102 may transmit and receive radio signals over one or more radio access networks. Baseband modem 206 may direct such communication functionality of communication device 102 according to the communication protocols associated with each radio access network, and may execute control over antenna system 202 and RF transceiver 204 in order to transmit and receive radio signals according to the formatting and scheduling parameters defined by each communication protocol. Although various actual designs may include separate communication components for different supported radio access technologies (e.g., a separate antenna, RF transceiver, digital signal processing subsystem, and controller), for purposes of conciseness the configuration of communication device 102 shown in FIG. 2 depicts only a single instance of each such components. Accordingly, in some aspects communication device 102 may include separate antennas, RF transceivers, digital signal processing subsystem, and and/or controllers for different supported radio access technologies, such as a set of first generation (1G) components, a set of second generation (2G) components, a set of third generation (3G) components, a set of fourth generation (4G) components, a set of fifth generation (5G) components, etc., and/or a set of components for a first short-range radio technology (e.g., WiFi), a set of components for a second short-range radio technology (e.g., Bluetooth), and so forth.

Communication device 102 may transmit and receive radio signals with antenna system 202, which may include analog antenna combination and/or beamforming circuitry and may be a single antenna or an antenna array that includes multiple antennas. In the receive path (RX), RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may accordingly include analog and digital reception components including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples. In the transmit path (TX), RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., a Power Amplifier (PA), filters, RF modulators (e.g., an RF IQ modulator), and digital-to-analog converters (DACs) to mix the digital baseband samples received from baseband modem 206 to produce the analog radio frequency signals for wireless transmission by antenna system 202. Baseband modem 206 may control the RF transmission and reception of RF transceiver 204, which can include specifying the transmit and receive radio frequencies for operation of RF transceiver 204. In some aspects, radio transceiver 204 may be a software-defined radio (SDR) component implemented as a processor configured to execute software-defined instructions that specify radio frequency processing routines As shown in FIG. 2, baseband modem 206 may include digital signal processing subsystem 208, which may perform physical layer (PHY; Layer 1) transmission and reception processing to prepare outgoing transmit data provided by controller 210 for transmission via RF transceiver 204 and prepare incoming received data provided by RF transceiver 204 for processing by controller 210. Digital signal processing subsystem 210 may accordingly perform one or more of error detection (e.g. CRC), forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Digital signal processing subsystem 208 may be structurally realized as hardware (e.g., as one or more digitally-configured hardware circuits, such as ASICs or FPGAs), as software (e.g., one or more processors configured to retrieve and execute program code that defines arithmetic, control, and/or I/O instructions and is stored in a non-transitory computer-readable storage medium), or as a mixed combination of hardware and software. Although not explicitly shown in FIG. 2, digital signal processing subsystem 208 may include a controller configured to control the various hardware and software processing components of digital signal processing subsystem 208 in accordance with physical layer control logic defined by the communications protocol for the relevant radio access technologies. In some aspects, in addition to a controller digital signal processing subsystem 208 may include one or more digitally-configured hardware circuits that are individually configured to perform a particular processing function. The controller may therefore distribute processing tasks to the one or more digitally configured hardware circuits, which may perform their assigned processing function on input data and provide the controller with the resulting output data. Furthermore, while digital signal processing subsystem 208 is depicted as a single component in FIG. 2, digital signal processing subsystem 208 may be collectively implemented as separate sections of physical layer processing components where each respective section is dedicated to, for example, the physical layer processing of a particular radio access technology.

Communication device 102 may be configured to operate according to one or more radio access technologies, which may be directed by controller 210. Controller 210 may thus be responsible for controlling the radio communication components of communication device 102 (antenna system 202, RF transceiver 204, and digital signal processing subsystem 208) in accordance with the communication protocols of each supported radio access technology, and accordingly may represent the Access Stratum and Non-Access Stratum (NAS) (also encompassing Layer 2 and Layer 3) of each supported radio access technology. Controller 210 may be structurally embodied as a protocol processor configured to execute protocol software (retrieved from a controller memory) and subsequently control the radio communication components of communication device 102 in order to transmit and receive communication signals in accordance with the corresponding protocol control logic defined in the protocol software.

Controller 210 may therefore be configured to manage the radio communication functionality of communication device 102 in order to communicate with the various radio access and core network components of radio communication network 100, and accordingly may be configured according to the communication protocols for multiple radio access technologies. In some aspects, controller 210 may be a unified controller that is collectively responsible for all supported radio access technologies, while in other aspects controller 210 may include multiple separate controllers where each controller is a dedicated controller for a particular radio access technology or group of technologies, such as a dedicated controller for a first radio access technology and a dedicated controller for a second radio access technology. Regardless, controller 210 may be responsible for directing radio communication activity of communication device 102 according to the communication protocols of the supported radio access technologies. As previously noted regarding digital signal processing subsystem 208, one or both of antenna system 202 and RF transceiver 204 may similarly be partitioned into multiply dedicated component sets that each respectively correspond to one or more of the supported radio access technologies. Depending on the specifics of each such configuration and the number of supported radio access technologies, controller 210 may be configured to control the radio communication operations of communication device 102 in accordance with, for example, a master/slave RAT hierarchical or multi-SIM scheme.

Communication device 102 may also include application processor 212, memory 214, and power supply 212. In some aspects, application processor 212 may be a CPU configured to execute various applications and/or programs of communication device 102 at an application layer of communication device 102, such as an operating system (OS), a user interface (UI) for supporting user interaction with communication device 102, and/or various user application programs. The application processor may interface with baseband modem 206 as an application layer to transmit and receive user data such as voice data, audio/video/image data, messaging data, application data, basic Internet/web access data, etc., over the radio network connection(s) provided by baseband modem 206.

Memory 214 may be a memory component of communication device 102, such as a hard drive or another such permanent memory device. Although not explicitly depicted in FIG. 2, in some aspects the various other components of communication device 102 shown in FIG. 2 may additionally each include integrated permanent and non-permanent memory components, such as for storing software program code, buffering data, holding current state information, etc.

Power supply 216 may be an electrical power source that provides power to the various electrical components of communication device 102. Depending on the design of communication device 102, power supply 216 may be a 'definite' power source such as a battery (rechargeable or disposable) or an 'indefinite' power source such as a wired electrical connection. Operation of the various components of communication device 102 may thus pull electrical power from power supply 216.

Communication devices 102 and 102 may execute mobility procedures to connect to, disconnect from, and switch between available network access nodes of the radio access network of radio communication network 100. As individual network access nodes of radio communication network 100 may have a specific coverage area, communication devices 102 and 102 may be configured to select and re-select between the available network access nodes in order to maintain a suitable radio access connection with the radio access network of radio communication network 100. For example, communication device 102 may establish a radio access connection with network access node 110 while communication device 102 may establish a radio access connection with network access node 120. In the event that the current radio access connection degrades, communication devices 102 or 104 may seek a new radio access connection with another network access node of radio communication network 100. For example, communication device 102 may move from the coverage area 122 of network access node 120 into the coverage area 112 of network access node 110. As a result, the radio access connection with network access node 120 may degrade, which communication device 102 may detect via radio measurements (e.g., signal strength or signal quality measurements) of network access node 120. Depending on the mobility procedures defined in the appropriate communication protocols for radio communication network 100, communication device 102 may seek a new radio access connection (which may be triggered at communication device 102 or by the radio access network), such as by performing radio measurements on neighboring network access nodes to determine whether any neighboring network access nodes can provide a suitable radio access connection. As communication device 102 may have moved into the coverage area 112 of network access node 110, communication device 102 may identify network access node 110 (which may be selected by communication device 102 or selected by the radio access network) and transfer to a new radio access connection with network access node 110. Such mobility procedures, including radio measurements, cell selection/reselection, and handover are established in the various communication protocols and may be employed by communication devices and the radio access network in order to maintain strong radio access connections between each communication device and the radio access network across any number of different radio access network scenarios.

Although reference may be made in the following description to communication device 102, e.g., that communication device 102 may receive a transmission, the same may apply to the relevant components of communication device 104 that may perform the described function, e.g., the receiver may receive the transmission.

Figure 3:
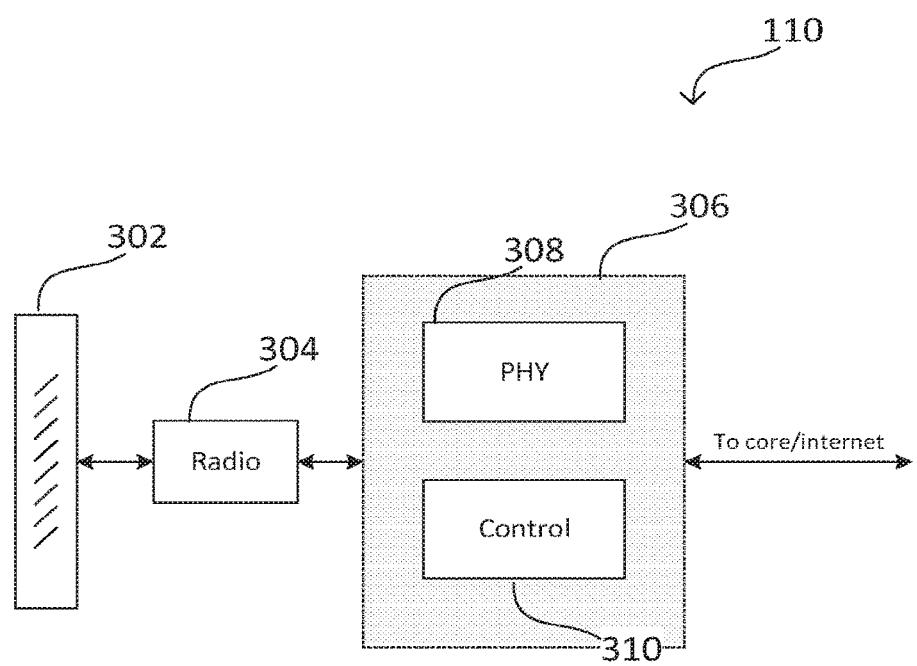
FIG. 3 shows an exemplary internal configuration of a network access node according to some aspects.

FIG. 3 shows an internal configuration of a network access node such as network access node 110. As shown in FIG. 3, network access node 110 may include antenna system 302, radio transceiver subsystem 304, and communication subsystem 306 (including physical layer subsystem 308 and controller 310). In an abridged overview of the operation of network access node 110, network access node 110 may transmit and receive radio signals via antenna system 302, which may be an antenna array including multiple antennas. Radio transceiver subsystem 304 may perform transmit and receive RF processing to convert outgoing digital data from communication subsystem 306 into analog RF signals to provide to antenna system 302 for radio transmission and to convert incoming analog RF signals received from antenna system 302 into digital data to provide to communication subsystem 306. Physical layer subsystem 308 may be configured to perform transmit and receive PHY processing on digital data received from radio transceiver subsystem 304 to provide to controller 110 and on digital data received from controller 310 to provide to radio transceiver subsystem 304. Controller 310 may control the communication functionality of network access node 110 according to the corresponding communication protocols, e.g., LTE, which may include exercising control over antenna system 302, radio transceiver subsystem 304, and physical layer subsystem 308. Each of radio transceiver subsystem 304, physical layer subsystem 308, and controller 310 may be structurally realized as hardware (e.g., as one or more digitally-configured hardware circuits, such as ASICs or FPGAs), as software (e.g., one or more processors configured to retrieve and execute program code that defines arithmetic, control, and/or I/O instructions and is stored in a non-transitory computer-readable storage medium), or as a mixed combination of hardware and software. In some aspects, radio transceiver subsystem 304 may be a radio transceiver including digital and analog radio frequency processing and amplification circuitry. In some aspects, radio transceiver subsystem 304 may be a software-defined radio (SDR) component implemented as a processor configured to execute software-defined instructions that specify radio frequency processing routines. In some aspects, physical layer subsystem 308 may include a controller and one or more hardware accelerators, wherein the controller is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be responsible for transport, internet, and application layer functions.

Network access node 110 may thus provide the functionality of network access nodes in radio communication networks by providing a radio access network to enable served communication devices to access desired communication data. For example, network access node 110 may also interface with a core network, one or more other network access nodes, or various other internet networks and servers via a wired or wireless backhaul interface.

Figure 4:
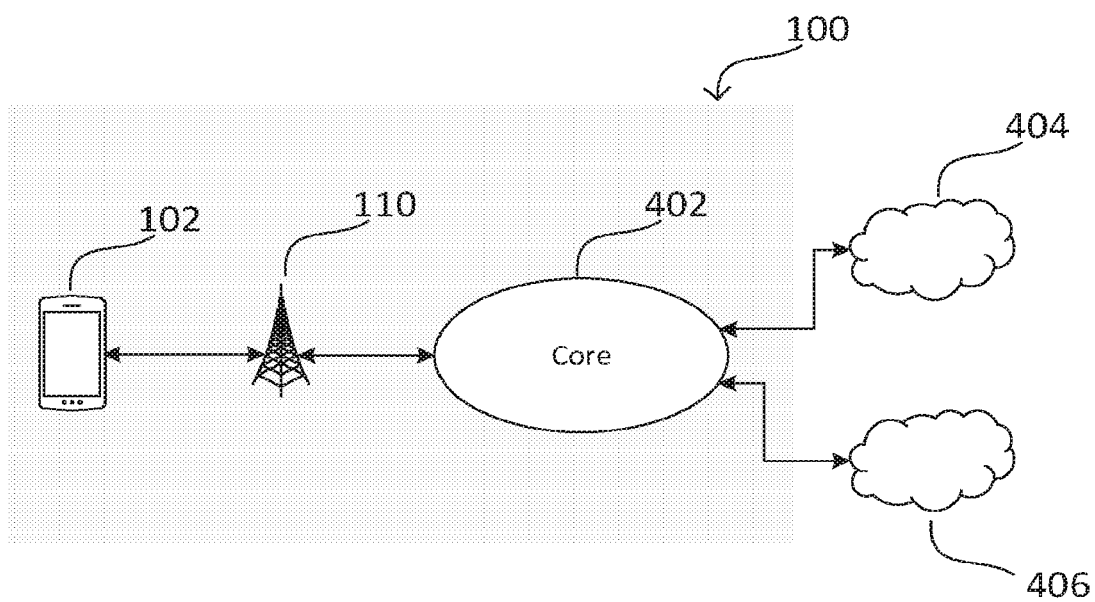
FIG. 4 shows an exemplary communication network interfacing with external data networks according to some aspects.

As previously indicated, network access nodes 110 and 112 may interface with a core network. FIG. 4 shows an exemplary configuration in accordance with some aspects where network access node 110 interfaces with core network 402, which may be a cellular core network. Core network 402 may provide a variety of functions essential to operation of radio communication network 100, such as data routing, authenticating and managing users/subscribers, interfacing with external networks, and various network control tasks. Core network 402 may therefore provide an infrastructure to route data between communication device 104 and various external networks such as data network 404 and data network 406. Communication device 104 may thus rely on the radio access network provided by network access node 110 to wirelessly transmit and receive data with network access node 110, which may then provide the data to core network 402 for further routing to external locations such as data networks 404 and 406 (which may be packet data networks (PDNs)). Communication device 104 may therefore establish a data connection with data network 404 and/or data network 406 that relies on network access node 110 and core network 402 for data transfer and routing.

Radio communications between communication devices and network access nodes may be executed according to standardized communication protocols that arm specific to the utilized radio access technology. As previously described regarding the functionalities of baseband modem 206 of communication device 102 and communication subsystem 306 of network access node 110, these communication protocols may govern functionalities such as signal formatting, transmission and reception scheduling, spectrum/bandwidth allocation, channel selection, mobility, connection management, and various higher-level control functionalities.

Various aspects of the present disclosure may generally relate to communication systems employing transmitters and receivers, e.g. implemented in corresponding base stations and communication devices (terminal devices), with one or more antennas, e.g. single antennas and/or one or more antenna arrays, e.g. phased antenna arrays. Thereby, in certain aspects, an antenna may be an antenna e.g. for sub-6 GHz communications e.g. in 5G/NR and/or LTE communication systems. In certain aspects, an antenna array being a group of antenna elements may be configured for communications in a 5G/NR communication system, in particular in frequency bands in accordance with an mmWave standard. While various aspects of the present disclosure may be particularly suitable to be applied to communication systems using frequency bands in accordance with 5G/NR mmWave standards, various aspects may be suitable in addition or alternatively for communication systems using sub-6 GHz frequency bands, e.g. for LTE communication systems. For example, certain aspects may in addition or alternatively relate to LTE serving cell measurements e.g. using partial or fractional numbers of OFDM symbols (e.g. based on received signals from regular antennas). In certain aspects, where e.g. a communication device includes one or more antenna arrays, elements of an antenna array may be combined in a way such that signals at particular angles experience constructive interference, while others experience destructive interference. Combining of antennas or elements of antenna arrays, in various aspects exemplarily being referred to as beamforming, may be applied at the receiver and/or the transmitter in order to achieve spatial selectivity. In various aspects, e.g. at a transmitter, relative phase and amplitude between elements of an antenna array may be controlled to create a directed wavefront. Correspondingly, in various aspects, elements at a receiver may be adjusted and/or combined for an expected direction of a signal to be received.

In various aspects, communication systems, such as e.g. 5G NR mmWave systems, may include communication devices and base stations which may perform reference signal measurements for different receive/transmit beam pairs. In various aspects, a communication device may be configured to perform receive beam sweeping while receiving reference signals from one or more base stations. In various aspects, when performing receive beam sweeping, a communication device or terminal device may change receive beams, e.g. analog beams based on RF phased array antennas. In other words, a receive beam may correspond to a receive configuration e.g. of two receive antennas. In various aspects, a receiver of a communication device may include an antenna array with a plurality of receive antennas which may be configured to be selectively enabled or disabled, while a receive configuration may correspond to a combination of enabled and/or disabled receive antennas. In various aspects, a receive configuration may in addition or alternatively be achieved by adjusting e.g. phase positions between antenna array elements to correspond to phase shifts within a received signal. In various aspects, a communication device may be configured to switch between at least two of such receive configurations of a receiver during a period where the communication device receives reference signals from a base station (e.g. a gNB).

In various aspects, reference signals, e.g. Channel State Information Reference Signals (CSI-RS), may be transmitted from a base station at predefined reference signal transmission times or timings. For example, reference signals, such as CSI-RS, may be allocated in each of a group of predefined orthogonal frequency-division multiplexing (OFDM) symbols. In certain aspects, a base station transmitting reference signals may thus for example provide reference signals at a predefined schedule to communication devices. In various aspects, communication devices may aim at estimating the received signal power of corresponding CSI-RS resource elements (REs). In various aspects, communication devices may additionally measure interference and noise.

Figure 5:
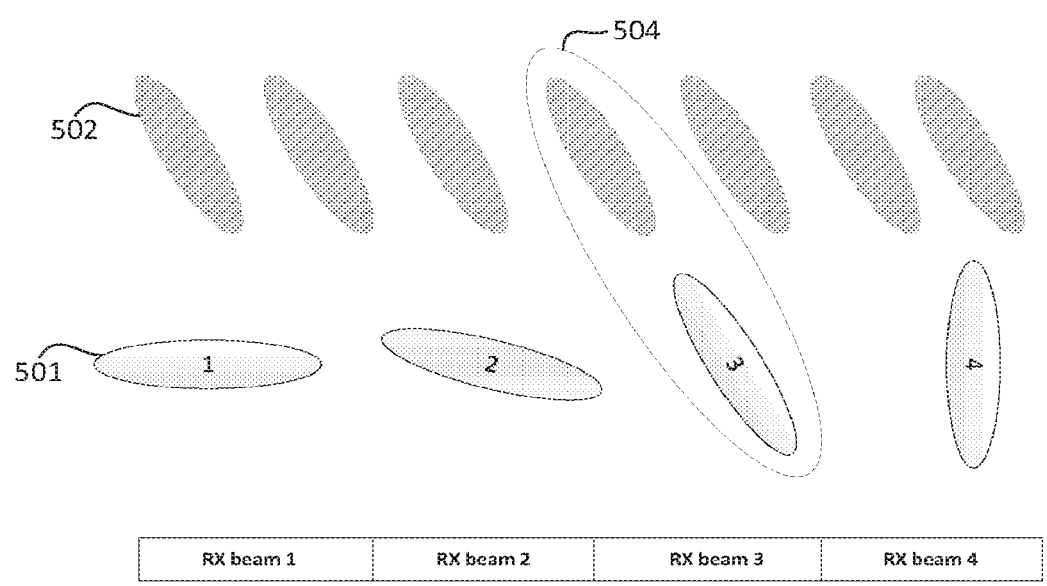
FIG. 5 exemplarily shows a general concept of beam sweeping.

FIG. 5 exemplarily shows a general concept of beam sweeping. Directed transmit beams 502 from a base station (only one beam is exemplarily labeled in the upper row for conciseness of the figure), e.g. from a gNB, are shown in an upper row in the figure. A lower row shows receive beams 501 (only one beam is exemplarily labeled in the lower row for conciseness of the figure) of a communication device, e.g. receive configurations of an antenna array of the communication device. As can be taken from the figure, in certain aspects, such receive beams may be considered as configurations corresponding to hypothetical directions of beams to be received at the communication device. Such configurations may in various aspects be achieved by adjusting e.g. the phase shifts of each antenna element of an antenna array and/or by enabling/disabling certain antenna elements of an antenna array so that a receive configuration of an antenna array corresponds to phase shifts within a received signal.

FIG. 5 exemplarily illustrates four measurement configurations for measuring reference signals at a communication device for different receive configurations of a corresponding antenna system. In FIG. 5, switching between different exemplary receive configurations is illustrated turning a receive beam direction of the communication device from an essentially horizontal direction in the figure to an essentially vertical direction in the figure. As further shown, the receive configuration corresponding to receive beam 3 corresponds to a situation where a receive beam direction of the communication device is essentially aligned to an actual direction of the beam received from the base station. This situation is marked in the figure with dashed line 504. In various aspects, configuration 504 may result in a high signal quality of the measured reference signal, e.g. in a high measured Reference Signal Receive Power (RSRP) and/or a high signal-to-interference-plus-noise ratio (SINR).

In various aspects, a plurality of measurements of a receive beam may be performed within a reception period of a reference signal, e.g. within one OFDM symbol. In various aspects, thereby, a beneficial receive beam measurement update rate may be achieved and in various aspect a beneficial beam selection performance may be enabled.

Figure 6:
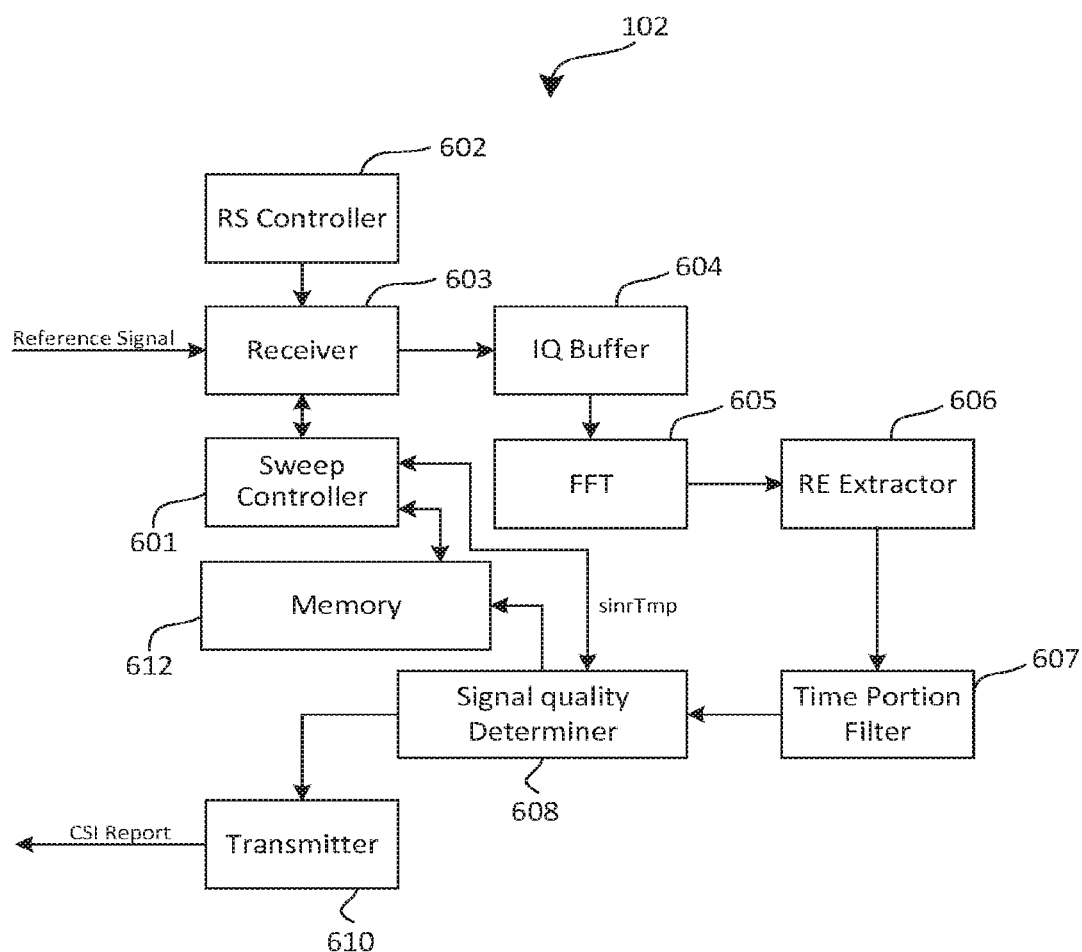
FIG. 6 shows an exemplary internal configuration of a communication device related to reference signal measurements in accordance with various aspects of the present disclosure.

FIG. 6 shows an exemplary internal configuration of a communication device 102 related to reference signal measurements in accordance with various aspects of the present disclosure. The components of communication device 102 of FIG. 6 may at least in part be incorporated in or may at least in part be part of the baseband modem 206 of the communication device 102 shown in FIG. 2. As the illustrated depiction of FIG. 6 is focused on reference signal measurements, for purposes of conciseness, FIG. 6 may not expressly show certain other components of communication device 102.

As shown in FIG. 6, in some aspects the communication device 102 may include receiver 603, sweep controller 601, reference signal controller 602, IQ buffer 604, transformer 605, resource element extractor 606, filterer (filtering circuitry) 607, signal quality determiner 608 and transmitter 610. Each of receiver 603, sweep controller 601, reference signal controller 602, IQ buffer 604, transformer 605, resource element extractor 606, filterer 607, signal quality determiner 608 and transmitter 610 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software.

For example, in various aspects, the receiver 603 may include at least two receive antennas, e.g. an antenna array including a plurality of receive antennas. For example, the at least two receive antennas or the antenna array may correspond to or be included in antenna system 202 of FIG. 2, while in certain aspects circuitry for performing actions and/or processing in relation to said antennas or said antenna array may be implemented as hardware and/or software in receiver 603.

While receiver 603, sweep controller 601, reference signal controller 602, IQ buffer 604, transformer 605, resource element extractor 606, filterer 607, signal quality determiner 608 and transmitter 610 are shown separately in FIG. 6, this depiction generally serves to highlight the operation of baseband modem 206 on a functional level. Receiver 603, sweep controller 601, reference signal controller 602, IQ buffer 604, transformer 605, resource element extractor 606, filterer 607, signal quality determiner 608 and transmitter 610 can therefore each be implemented as separate hardware and/or software components, or one or more of receiver 603, sweep controller 601, reference signal controller 602, IQ buffer 604, transformer 605, resource element extractor 606, filterer 607, signal quality determiner 608 and transmitter 610 can be combined into a unified hardware and/or software component (for example, a hardware-defined circuitry arrangement including circuitry to perform multiple functions, or a processor configured to execute program code that defines instructions for multiple functions).

In various aspects of the present disclosure, the communication device 102 includes a receiver 603 including at least two receive antennas. The receiver 603 is configured to receive at least one reference signal, e.g. a CSI-RS, out of a plurality of reference signals, each reference signal being transmitted from at least one base station at a predefined reference signal transmission time. In certain aspects, the reference signals may be specifically intended to be used by communication device 102 to acquire channel-state information, for example for channel-dependent scheduling or the like. In various aspects, reference signals such as CSI-RS can be transmitted from a corresponding base station, e.g. from a gNB in accordance with a 5G specification, at predefined periodic reference signal transmission times. In certain aspects, CST-RSs can in addition or alternatively be triggered, e.g. via control signals, to be aperiodically transmitted. In various aspects, said predefined reference signal transmission times may be predefined within a predefined group of OFDM symbols.

In various aspects, the communication device 102 further includes a controller, e.g. the sweep controller 601, configured to switch between at least two receive configurations of the at least two antennas during a reception period of the at least one reference signal. In these aspects, the sweep controller 601 may switch more than one time between receive configurations within a reception period of a single reference signal. In various aspects, the sweep controller 601 may be configured to switch between a full set of receive configurations within a reception period of a single reference signal. In various aspects, the sweep controller 601 may be configured to switch between a full set of receive configurations within a reception period of more than a single reference signal while switching between at least two receive configurations with a reception period of a single reference signal. In certain aspects, a full set of receive configurations may correspond to a full set of possible and/or desired configurations of an antenna array of communication device 102. In various aspects, the sweep controller 601 may perform switching between receive configurations within a subset of e.g. a group of all technically possible receive configurations of an antenna array during a measurement period during which one reference signal is received and may perform switching between receive configurations within a different subset of receive configurations e.g. in a different measurement period during which another reference signal is received. In certain aspects, such subsets may overlap.

In various aspects, the communication device further includes the signal quality determiner 608 configured to determine a parameter indicative of a first signal quality of the received reference signal for each receive configuration. The parameter may in certain aspects be a Reference Signal Received Power (RSRP) of the reference signal. The parameter may in certain aspects be in addition or alternatively a signal-to-interference-plus-noise ratio (SINR). Thus, in various aspects, communication device 102 may be configured to perform multiple signal quality measurements within a reception period of a reference signal by switching between multiple (e.g. at least two) receive configurations within a reception period of e.g. a single reference signal, e.g. within one OFDM symbol. Given a fixed schedule of reference signals provided by a base station to the communication device, while accepting a potentially reduced measurement accuracy, an ideal receive configuration for a signal beam transmitted by a base station can be found at the communication device faster by performing multiple reference signal measurements within individual reference signals.

Figure 7:
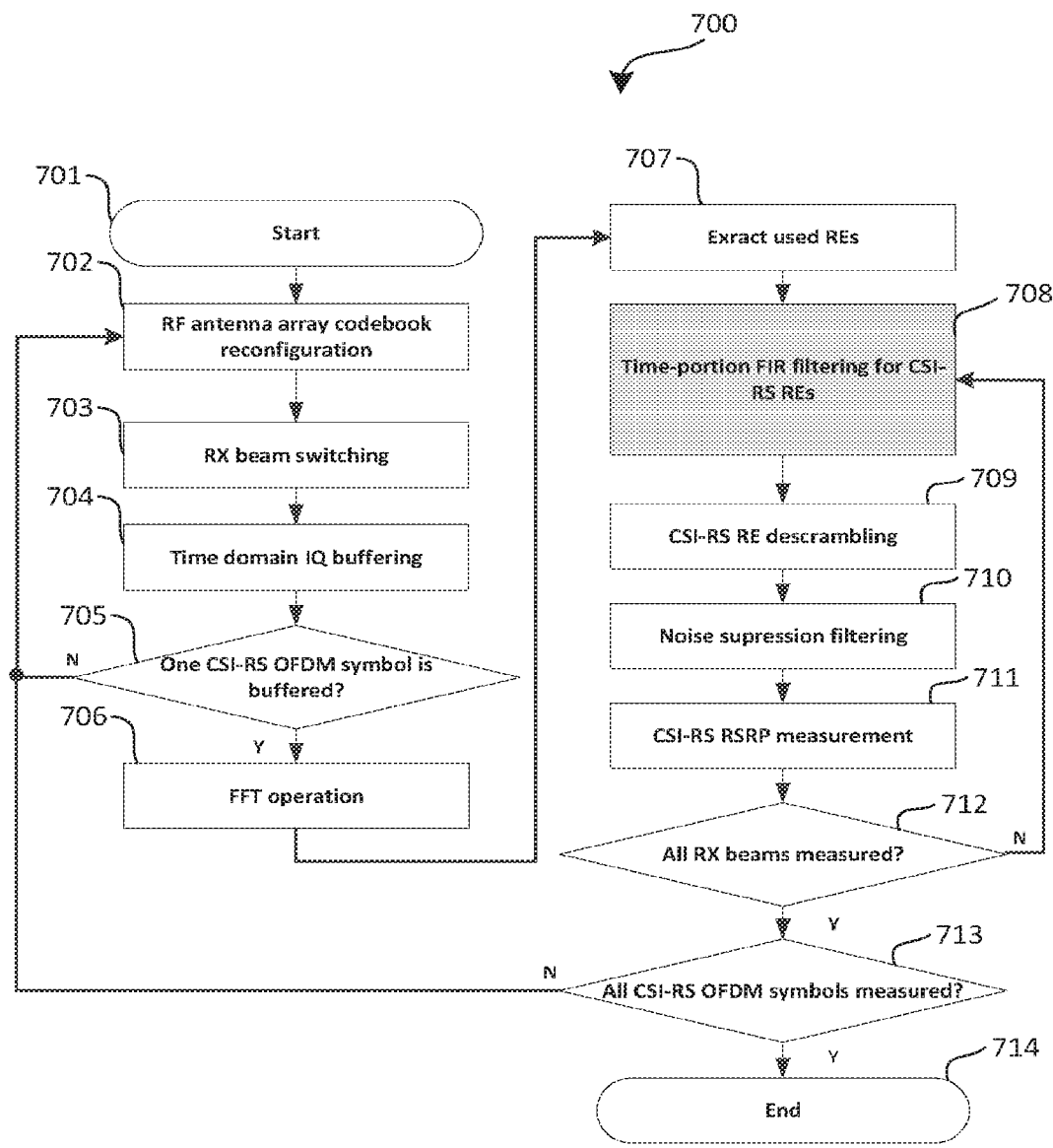
FIG. 7 shows an exemplary method which a communication device may perform using the components of FIG. 6.

FIG. 7 shows exemplary method 700 which communication device 102 may perform using the components of FIG. 6. In various aspects, method 700 of performing beam sweeping during reception of at least one reference signal may be performed between discontinuous reception (DRX) cycles when there is no receive traffic. After start of the method at stage 701, the sweep controller 601 of communication device 102 may at stage 702 perform antenna array codebook reconfiguration. Such codebook reconfiguration may in various aspects include initially a use of a predefined default set of receive configurations, a selection of a subset of existing receive configurations to be tested e.g. in a following loop of method 700 from a given total set, and/or an update of codebook entries, e.g. determining new optimized receive configurations, e.g. a new combination of enabled/disabled antennas or new phase shifts. The sweep controller 601 then performs receive (Rx) beam sweeping or switching by switching between at least two receive configurations during a reception period of a reference signal at stage 703. While switching between receive configurations, data corresponding to the received signal, i.e. a received time domain signal, is stored in a corresponding memory. In certain aspects, to this end, IQ data representing phase, amplitude and frequency of the received time domain signal is stored in IQ buffer 604 at stage 704. The reference signal controller 602 determines at stage 705 if a full OFDM symbol including a CSI-RS is stored in IQ buffer 604. If not, stages 702 to 705 are repeated until a full OFDM symbol including a CST-RS is determined to be stored at stage 705.

In accordance with various aspects of the present disclosure, when a full time-domain OFDM symbol including a reference signal is buffered, the transformer 605 transforms the full time-domain OFDM symbol including the reference signal from the time domain into the frequency domain at stage 706. In other words, in various aspects, a time domain reference symbol is received using a plurality of receive configurations and buffered before the reference symbol is transformed from the time domain into the frequency domain e.g. in a single transformation. In various aspects, the transformer 605 transforms the reference signal from the time domain into the frequency domain using a Fourier Transform (FT), e.g. using a Fast Fourier Transform (FFT) at stage 706. Following the transformation, the resource element (RE) extractor 606 extracts (converts) resource elements, e.g. frequency resource elements, used for transmitting the RS from the base station to the communication device from the frequency domain signal at stage 707.

In various aspects, the filterer 607 performs multiple time-portion (TP) filtering in the frequency domain on the extracted (converted) reference signal resource elements at stages 708 to 712. For example, the filterer 607 may in certain aspects apply time-portion filtering functions in the frequency domain, whereby time-portion filtering functions may correspond to respective receive beams (receive configurations). In various aspects, each TP filtering may at least essentially keep only power contributions of a single receive beam corresponding to a respective TP filter and may essentially exclude all power contributions corresponding to different receive beams.

Figure 8:
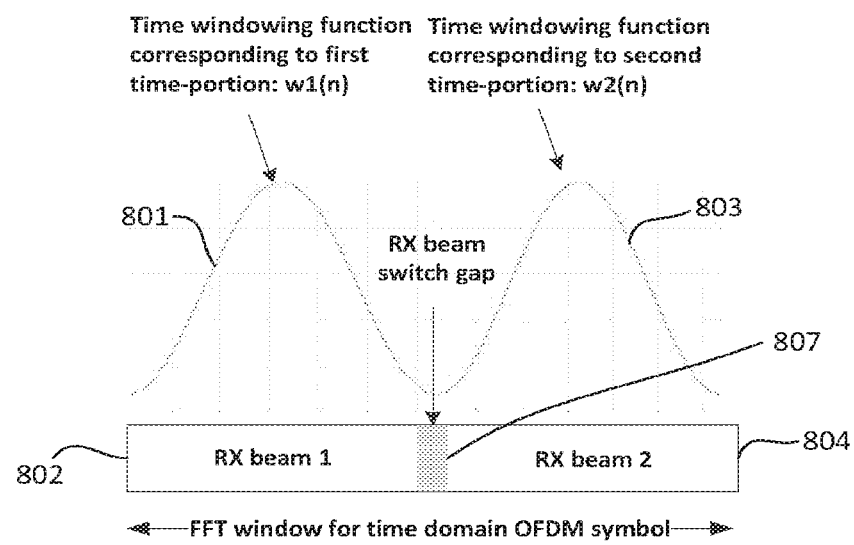
FIG. 8 shows an excerpt of a FFT window for a time-domain OFDM symbol including a reference signal.

FIGS. 8 and 9 exemplarily and conceptually illustrate a time-portion filtering. FIG. 8 shows an excerpt of a FFT window for a time-domain OFDM symbol including a reference signal. As indicated in the figure, during a period during which the receiver 603 receives the reference signal the sweep controller 601 switches between respective receive configurations, i.e. between respective receive beams. For conciseness purposes, FIG. 8 only illustrates a first receive beam "RX beam 1" 802 and a second receive beam "RX beam 2" 804, while in certain aspects, the concept of beam sweeping is scalable to any desirable number of receive beams. FIG. 8 further shows exemplary windowing functions in the time domain, where w1(n) 801 is a time window function corresponding to the first receive beam 802 and where w2(n) 803 is a time window function corresponding to the second receive beam 804. A window function being a function that is essentially zero-valued outside of an interval corresponding to the period during which the reference signal is received with a respective receive configuration may be chosen in accordance with the requirements of a system in question. For example, a window function may be selected from the group consisting of but not limited to rectangular window, B-spline window, Triangular window, Parzen window, Sine window, Hann or Hanning window, Hamming window, Heiser window, Blackman window, Nuttal window, Gaussian window, etc. Window functions may in certain aspects include real and/or imaginary valued functions. FIG. 8 further illustrates a switching gap 807 which corresponds to a time interval corresponding to the time needed by sweep controller 601 to switch from one receive configuration to a next receive configuration.

Figure 9A:
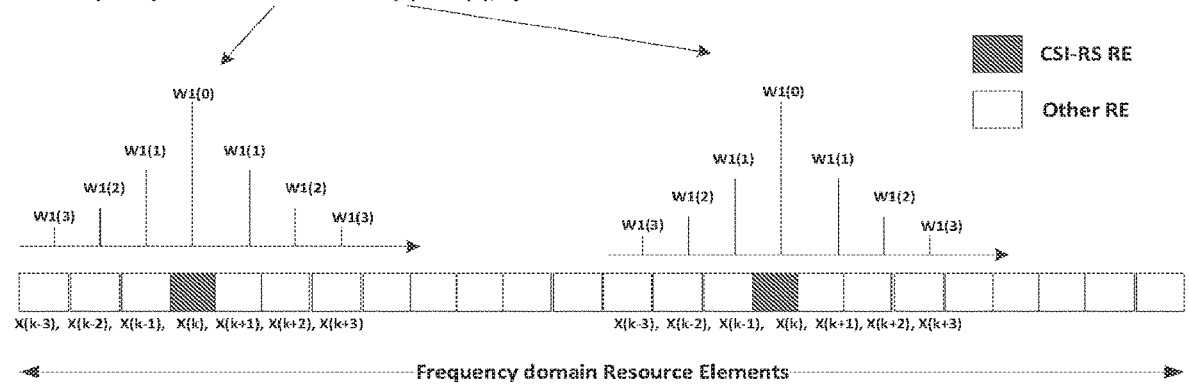
FIG. 9A exemplarily illustrates TP filtering for one receive beam shown in FIG. 8.
Figure 9B:
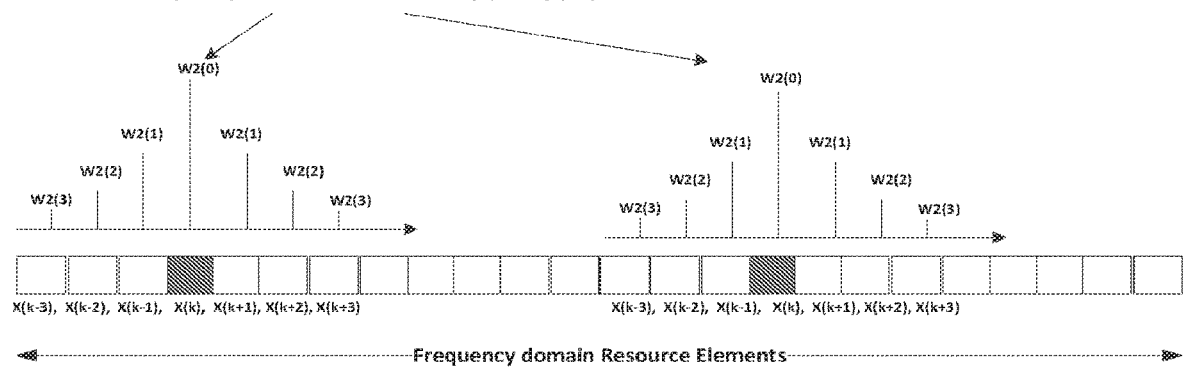
FIG. 9B exemplarily illustrates TP filtering for another receive beam shown in FIG. 8.

In various aspects, the filterer 607 applies a filtering function to the frequency domain reference signal. FIGS. 9A and 9B exemplarily illustrate TP filtering for receive beams 802 and 804 of FIG. 8 and exemplarily shows frequency transfer functions W1(k) (FIG. 9A) and W2(k) (FIG. 9B)

corresponding to the time domain window functions w1(n), w2(n) of FIGS. 9A/B, respectively. The frequency transfer functions are shown along frequency domain resource elements, where frequency resource elements of the reference signals are highlighted with grey shading. In various aspects, filterer 607 applies a Finite Impulse Response (FIR) filter.

In various aspects, the TP filtering as illustrated using FIGS. 8, 9A and 9B can be described as follows:

$$X_m(k) = \sum_{l=-L}^{L} X(k+l) \cdot W_m(l), \qquad (1)$$

where k∈{CSI-RS indices}.

In the above equation, X(k) are frequency-domain resource elements in the used subcarrier band, $X_m(k)$ is the TP filtered CSI-RS resource element containing only the power contributions from receive beam (e.g. antenna receive configuration) m and excluding power contributions from other receive beams. $W_m(l)$ is the frequency-domain transfer function of a window function corresponding to the time-portion of the receive beam m as e.g. illustrated in FIG. 8 for m=1, 2. As can be taken from FIGS. 9A and 9B, because the time window function is real valued, the corresponding transfer function is symmetric:

$$W_m(l) = W_m(-l), \text{ where } 0 \le l \le L. \qquad (2)$$

Equation (1) may therefore be expressed as follows:

$$X_m(k) = \sum_{l=1}^{L} [X(k+l) + X(k-l)] \cdot W_m(l) + X(k) \cdot W_m(0), \qquad (3)$$

where k∈{CSI-RS indices}.

Thereby, L is the number of effective (non-zero) taps of $W_m$. In various aspects, a windowing function with smoothing time-domain transition edges may be employed to suppress inter-carrier-interference (ICI). In such aspects, a smaller value of L may be sufficient (e.g. L=3 when using a Hanning window function). An effect may thus be achieved in certain aspects that computation complexity may be reduced.

Thus, in various aspects, the filterer 607 may employ a time-portion (TP) filtering for each receive beam selected by the sweep controller 601 during a reception period of a reference signal. The TP filtering may aim in various aspects at a separation of respective power contributions of respective receive beams (receive configurations) targeted by a corresponding window function in the time domain.

Turning back to FIG. 7, following the time-portion filtering at stage 708, the filterer 607 may further descramble the reference signal resource elements at stage 709 and may further apply noise suppression filtering to improve the signal quality at stage 710. Following stage 710, the signal quality determiner 608 may perform measurements on the reference signals by determining e.g. the Reference Signal Receive Power of the reference signal, e.g. of the CSI-RS at stage 711. At stage 713, the reference signal controller 602, may determine if all reference signals transmitted from the base station have been subject to a measurement. If not, the method 700 returns to stage 702. If all reference signals received from the base station, e.g. in a predetermined time interval, have been subject to a measurement by signal quality determiner 608, the method 700 ends at stage 714. In certain aspects, transmitter 610 may transmit measurement results achieved with method 700 to a corresponding base station as Channel State Information (CSI) report and/or use the measurement results for deciding on a receive configuration to be used e.g. for data communication with the corresponding base station.

Various aspects of the present disclosure may employ dynamic receive beam sweeping. In these aspects, the communication device 102 may be configured to track signal quality values of each RX beam candidate. To this end, in certain aspects, the communication device 102 may be configured to employ Infinite Impulse Response (IIR) filtering. The communication device 102 may in these aspects be configured to dynamically adjust a receive configuration time during which the at least one reference signal is received with a respective receive configuration. In addition, the communication device 102 may be configured to dynamically adjust a measurement rate of each receive beam candidate in a beam sweeping period.

In various aspects, the communication device 102 may be configured to employ a shorter receive beam measurement duration (e.g. a partial OFDM symbol per receive beam candidate) for a group of one or more receive beam candidates, if a reference signal measurement indicates sufficiently high received signal quality for at least one beam among the candidates. In various aspects the communication device 102 may be configured to employ a longer receive beam measurement duration (e.g. a full OFDM symbol per receive beam candidate) for a group of one or more receive beam candidates, if a reference signal measurement indicates low signal quality for at least one beam among the candidates. In various aspects, the communication device 102 may be configured to exclude a measurement of a reference signal using certain receive beams or configurations e.g. for a predefined number of beam sweeping periods if a predicted or measured signal quality for these receive beams is below a predefined threshold.

In various aspects, the sweep controller 601 may be configured to adjust a time period during which the at least one reference signal is received with a respective receive configuration based on a second signal quality of the reference signal received with the respective receive configuration. In other words, in various aspects, an on-duration for a respective receive beam or a respective receive configuration may be dynamically adjusted based on a tracked signal quality of each receive beam. In certain aspects, a quality metric (e.g. for estimating the second signal quality) can be a time filtered (tracked) SINR estimation of the corresponding receive beam from a recent measurement. A recent measurement may for example be a measurement of a previous or recent reference signal using the respective receive configuration. In certain aspects, the sweep controller 601 may employ in a next reference signal measurement a shorter on-duration (e.g. partial OFDM symbol) for a respective receive beam when the tracked SINR value of said receive beam in a current reference signal measurement is high. In various aspects, to this end, a signal quality determined by signal quality determiner 608 in a current measurement may be stored in memory 612 of the communication device 102. In a next reference signal measurement or sweeping period, the sweep controller 601 may refer to said memory 612 to determine and/or adjust the time period during which the reference signal is received with a respective receive configuration. In certain aspects, when a tracked SINR of a receive beam is low, the sweep controller 601 may employ a longer on-duration for such receive beam (e.g. a full OFDM symbol or more even longer) in a next measurement of a reference signal or receive beam sweeping period.

FIG. 10 shows exemplary method 1000 which communication device 102 may perform using the components of FIG. 6. In certain aspects, method 1000 may for example be performed by sweep controller 601 and signal quality determiner 608. In various aspects, method 1000 may be based on a table which stores for each one of a predefined number of receive configurations an index value i, a mask value mask (i), an on-duration parameter L(i) defining a time period during which the reference signal is received with the receive configuration corresponding to index value i, a signal quality metric value resulting from a previous signal quality measurement SINR(i). Method 1000 exemplarily employs SINR(i) as signal quality metric value while, in various aspects, method 1000 may alternatively or in addition apply RSRP. Alternatively (or in addition), in certain aspects, e.g. intermediate SINR/RSRP estimations across multiple receive beam sweeping periods for a same receive beam can be employed.

Using method 1000, the sweep controller 601 may in various aspects be configured to skip switching to certain receive configurations when a signal quality value determined in a previous sweeping period is below a predefined threshold. In addition, the sweep controller 601 may in various aspects be configured to set a time period during which the reference signal is received with a respective receive configuration, also referred to as on-duration, based on a signal quality determined for the respective receive beam in a previous sweeping period.

As shown in FIG. 10, after starting the method 1000 at stage 1001, sweep controller 601 loads said values mask(i), L(i) and SINR(i) from memory 612 for receive configuration i at stage 1002. At stage 1003 sweep controller 601 determines if the mask value of receive configuration i is equal to 0 or larger than 0. By setting the mask value larger than 0, the sweep controller 601 may in various aspects be configured to exclude a respective receive configuration from method 700 for a number of sweeping periods, the number corresponding to the mask value. Thereby, in various aspects, a sweeping period may correspond to a period of time during which sweep controller 601 may switch between receive configurations included in a predefined group of receive configurations. Said predefined group of receive configurations may in various aspects correspond to the number of possible and/or desired antenna configurations of an antenna array of the communication device 102. As indicated in FIG. 10, when the mask value is larger than 0, the value is updated by reducing its value by 1 and storing the updated mask value for receive configuration i into memory 612 at stage 1010.

If the sweep controller 601 determines the mask value to be 0, the method 1000 proceeds to stage 1004 where the sweep controller 601 sets a time period during which the reference signal is received with receive configuration i to a stored value L(i). At stage 1005, within the on-duration, i.e. during said time period, the signal quality determiner 608 may determine an intermediate SINR value for receive configuration i. Based thereon, sweep controller 601 may perform signal processing for compensating effects due to inter-carrier-interference (ICI) at stage 1006. Upon performing processing at stage 1006, sweep controller 601 may add value LUT0 to the intermediate SINR value determined at the preceding stage 1005. The value LUT0 may in various aspects be taken from a look-up table e.g. stored in memory 612 to compensate for an SNR penalty offset, which may in certain aspects be introduced due to ICI from the windowing function. For example, a more rectangular window function may introduce a higher degree of ICI as a smoother window function. In certain aspects, such SNR penalty offset is compensated in particular because it does not reflect any noise or interference in a real channel but may be an artificial effect introduced by used algorithms. The SNR penalty may in various aspects be known in advance, can be offline precomputed or simulated for a particular windowing function. The value LUT0 may in certain aspects be equal to 0 when L(i) is a multiple of an integer number of full OFDM symbols.

At stage 1007, sweep controller 601 updates the tracked signal quality value SINR(i) stored for the receive configuration i as a weighted sum of the previous tracked signal quality value SINR(i) and the intermediate SINR value processed at stage 1007. The parameter F is a weighting factor chosen between 0 and 1, which may be prestored in memory 612 or which may be dynamically adjusted. In certain aspects, the parameter F may be referred to as forgetting factor for a one tap infinite impulse response (IIR) filter. In certain aspects, the parameter F may be dynamically adjusted e.g. to provide a larger weight to measurements with a longer on-duration, e.g. measurements of a full OFDM symbol, as compared to measurements with a shorter on-duration, e.g. measurements of half an OFDM symbol. In certain aspects, alternatively or in addition, the parameter F may be dynamically adjusted based on the on-duration parameter L(i). Based on the updated tracked signal quality value, the sweep controller 601 updates the on-duration for the current receive beam i for a next sweeping period at stage 1008. In various aspects, to this end, the sweep controller 601 sets the updated on-duration as value LUT1 which is a value taken from a further look-up table which may be stored in memory 612. In various aspects, the look-up table may store values LUT1 to adjust a measurement duration of each receive beam i for a next sweep period such that a higher SINR value will be mapped to a shorter time period during which the reference signal is received with receive configuration i. Conversely, in certain aspects, a lower SINR value may be mapped to longer receive beam durations.

At stage 1009, the mask value for receive beam i is updated for a next sweeping period by referring to a third look-up table setting this value to the value LUT2(SINR(i)). In various aspects, the value LUT2 may be used to control the mask of RX beam candidate i for the next RX beam sweeping periods. For example, in a case where a tracked SINR value for receive configuration i may be below a predefined threshold, LUT2 may be a non-zero positive integer number N. Such value of LUT2 results in skipping measurements for receive beam i in the next N sweeping periods.

In various aspects, providing a dynamic receive beam sweeping including an adjustment of a time period during which a reference signal is received with a respective receive configuration based on a second signal quality may thus provide a beneficial balance between: (1) beam measurement accuracy, (2) receive beam sweeping rate, and (3) receive beam sweeping overall on-duration.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The following examples pertain to further aspects of this disclosure:

The subject matter of Example 1 is a communication device including: a receiver including at least two receive antennas and configured to receive at least one reference signal of a plurality of reference signals, each reference signal being transmitted from at least one base station at a predefined reference signal transmission time; a controller configured to switch between at least two receive configurations of the at least two antennas during a reception period of the at least one reference signal; and a signal quality determiner configured to determine a parameter indicative of a first signal quality of the received reference signal for each receive configuration.

In Example 2, the subject matter of Example 1 can optionally include wherein a receive configuration corresponds to a hypothetical direction of a received signal.

In Example 3, the subject matter of any one of Examples 1 or 2 can optionally include wherein a receive configuration corresponds to a set of phase shifts, each of which is applied to one of the at least two antennas for signal reception.

In Example 4, the subject matter of any one of Examples 1 to 3 can optionally include wherein the receiver includes an antenna array with a plurality of receive antennas, the controller being configured to selectively enable or disable each of the antennas, wherein a receive configuration corresponds to a combination of enabled and/or disabled receive antennas.

In Example 5, the subject matter of any one of Examples 1 to 4 can optionally include wherein the controller is configured to switch between at least two of the receive configurations during a reception period of a single reference signal.

In Example 6, the subject matter of any one of Examples 1 to 5 can optionally include wherein the parameter indicative of the first signal quality of the received reference signal is a received power of the reference signal.

In Example 7, the subject matter of any one of Examples 1 to 6 can optionally include further including a filtering circuitry configured to apply a filtering function to the received reference signal to generate a respective contribution of the reference signal received with a corresponding one of the at least two receive configurations of the at least two antennas.

In Example 8, the subject matter of Example 7 can optionally include further including a transformer configured to convert the reference signal received in the time domain into a frequency domain reference signal, wherein the filtering circuitry is configured to apply the filtering function to the frequency domain reference signal.

In Example 9, the subject matter of any one of Examples 7 or 8 can optionally include wherein the filtering function is a finite impulse response (FIR) filtering function applied in the frequency domain.

In Example 10, the subject matter of any one of Examples 1 to 9 can optionally include wherein the controller is configured to adjust a time period during which the at least one reference signal is received with a respective receive configuration based on a second signal quality of the reference signal received with the respective receive configuration.

In Example 11, the subject matter of Example 10 can optionally include wherein the controller is configured to adjust the time period during which the at least one reference signal is received with a respective receive configuration to be shorter for a higher second signal quality.

In Example 12, the subject matter of any one of Examples 1 to 9 can optionally include wherein the controller is configured to switch between receive configurations included in a predefined group of receive configurations, wherein the controller is configured to exclude a respective receive configuration from said group, when a second signal quality of the reference signal received with the respective receive configuration is below a predefined threshold.

In Example 13, the subject matter of Example 12 can optionally include wherein the controller is configured to switch between the receive configurations included in the predefined group during a sweeping period, and wherein the controller is configured to exclude the respective receive configuration for a predetermined number of sweeping periods.

In Example 14, the subject matter of any one of Examples 10 to 13 can optionally include wherein the second signal quality is a signal quality of the reference signal received with the respective receive configuration in at least one previous measurement of a reference signal.

In Example 15, the subject matter of any one of Examples 10 to 14 can optionally include wherein the second signal quality is a signal-to-interference-plus-noise ratio (SINR).

In Example 16, the subject matter of any one of Examples 1 to 15 can optionally include wherein the reference signal is a Channel State Information Reference Signal (CSI-RS).

In Example 17, the subject matter of any one of Examples 1 to 16 can optionally include wherein the reference signal is received within an orthogonal frequency-division multiplexing (OFDM) symbol.

In Example 18, the subject matter of any one of Examples 1 to 17 can optionally include wherein the at least two receive antennas form a phased array, and wherein a receive configuration corresponds to a set of phase shifts, each of which is applied to one of the at least two antennas for signal reception.

The subject matter of Example 19 is a terminal device including: a receiver configured to receive at least one reference signal from at least one base station; a controller configured to switch between at least two receive configurations during a reception period of the at least one reference signal; a transformer configured to convert the reference signal received in the time domain into a frequency domain reference signal; a filtering circuitry configured to apply a filtering function to the converted reference signal to generate a respective contribution of the reference signal received with a corresponding one of the at least two receive configurations.

In Example 20, the subject matter of Example 19 can optionally include wherein the receiver includes at least two receive antennas, and wherein a receive configuration is a receive configuration of the at least two antennas.

In Example 21, the subject matter of any one of Examples 19 or 20 can optionally include wherein a receive configuration corresponds to a hypothetical direction of a received signal.

In Example 22, the subject matter of any one of Examples 19 to 21 can optionally include wherein a receive configuration corresponds to a set of phase shifts, each of which is applied to one of the at least two antennas for signal reception.

In Example 23, the subject matter of any one of Examples 19 to 22 can optionally include wherein the receiver includes an antenna array with a plurality of receive antennas, the controller being configured to selectively enable or disable each of the antennas, wherein a receive configuration corresponds to a combination of enabled and/or disabled receive antennas.

In Example 24, the subject matter of any one of Examples 19 to 23 can optionally include wherein the controller is configured to switch between at least two of the receive configurations during a reception period of a single reference signal.

In Example 25, the subject matter of any one of Examples 19 to 24 can optionally include wherein the filtering function is a finite impulse response (FIR) filtering function applied in the frequency domain.

In Example 26, the subject matter of any one of Examples 19 to 25 can optionally include further including a signal quality determiner configured to determine a parameter indicative of a first signal quality of the received reference signal for each receive configuration.

In Example 27, the subject matter of Example 26 can optionally include wherein the parameter indicative of the first signal quality of the received reference signal is a received power of the reference signal.

In Example 28, the subject matter of any one of Examples 19 to 27 can optionally include wherein the controller is configured to adjust a time period during which the at least one reference signal is received with a respective receive configuration based on a second signal quality of the reference signal received with the respective receive configuration.

In Example 29, the subject matter of Example 28 can optionally include wherein the controller is configured to adjust the time period during which the at least one reference signal is received with a respective receive configuration to be shorter for a higher second signal quality.

In Example 30, the subject matter of any one of Examples 19 to 27 can optionally include wherein the controller is configured to switch between receive configurations included in a predefined group of receive configurations, wherein the controller is configured to exclude a respective receive configuration from said group, when a second signal quality of the reference signal received with the respective receive configuration is below a predefined threshold.

In Example 31, the subject matter of Example 30 can optionally include wherein the controller is configured to switch between the receive configurations included in the predefined group during a sweeping period, and wherein the controller is configured to exclude the respective receive configuration for a predetermined number of sweeping periods.

In Example 32, the subject matter of any one of Examples 28 to 31 can optionally include wherein the second signal quality is a signal quality of the reference signal received with the respective receive configuration in at least one previous measurement of a reference signal.

In Example 33, the subject matter of any one of Examples 28 to 32 can optionally include wherein the second signal quality is a signal-to-interference-plus-noise ratio (SINR).

In Example 34, the subject matter of any one of Examples 19 to 33 can optionally include wherein the reference signal is a Channel State Information Reference Signal (CSI-RS).

In Example 35, the subject matter of any one of Examples 19 to 34 can optionally include wherein the reference signal is received within an orthogonal frequency-division multiplexing (OFDM) symbol.

In Example 36, the subject matter of any one of Examples 19 to 35 can optionally include wherein the at least two receive antennas form a phased array, and wherein a receive configuration corresponds to a set of phase shifts, each of which is applied to one of the at least two antennas for signal reception.

The subject matter of Example 37 is a communication method for a communication device, the method including: receiving at least one reference signal of a plurality of reference signals, each reference signal being transmitted from at least one base station at a predefined reference signal transmission time; switching between at least two receive configurations of at least two antennas of the communication device during a reception period of the at least one reference signal; and determining a parameter indicative of a first signal quality of the received reference signal for each receive configuration.

In Example 38, the subject matter of Example 37 can optionally include wherein a receive configuration of the at least two antennas corresponds to a hypothetical direction of a received signal.

In Example 39, the subject matter of any one of Examples 37 or 38 can optionally include wherein a receive configuration corresponds to a set of phase shifts, each of which is applied to one of the at least two antennas for signal reception.

In Example 40, the subject matter of any one of Examples 37 to 39 can optionally include further including selectively enabling or disabling each of a plurality of receive antennas included in an antenna array of the communication device, a receive configuration corresponding to a combination of enabled and/or disabled receive antennas.

In Example 41, the subject matter of any one of Examples 37 to 40 can optionally include further including switching between at least two of the receive configurations during a reception period of a single reference signal.

In Example 42, the subject matter of any one of Examples 37 to 41 can optionally include wherein the parameter indicative of the first signal quality of the received reference signal is a received power of the reference signal.

In Example 43, the subject matter of any one of Examples 37 to 42 can optionally include further including a applying a filtering function to the received reference signal to generate a respective contribution of the reference signal received with a corresponding one of the at least two receive configurations.

In Example 44, the subject matter of Example 43 can optionally include further including converting the reference signal received in the time domain into a frequency domain reference signal, wherein applying the filtering function includes applying the filtering function to the frequency domain reference signal.

In Example 45, the subject matter of any one of Examples 43 or 44 can optionally include wherein the filtering function is a finite impulse response (FIR) filtering function applied in the frequency domain.

In Example 46, the subject matter of any one of Examples 37 to 45 can optionally include further including adjusting a time period during which the at least one reference signal is received with a respective receive configuration based on a second signal quality of the reference signal received with the respective receive configuration.

In Example 47, the subject matter of Example 46 can optionally include further including adjusting the time period during which the at least one reference signal is received with a respective receive configuration to be shorter for a higher second signal quality.

In Example 48, the subject matter of any one of Examples 37 to 45 can optionally include further including switching between receive configurations included in a predefined group of receive configurations, and excluding a respective receive configuration from said group, when a second signal quality of the reference signal received with the respective receive configuration is below a predefined threshold.

In Example 49, the subject matter of Example 48 can optionally include further including switching between the receive configurations included in the predefined group during a sweeping period, and excluding the respective receive configuration for a predetermined number of sweeping periods.

In Example 50, the subject matter of any one of Examples 46 to 49 can optionally include wherein the second signal quality is a signal quality of the reference signal received with the respective receive configuration in at least one previous measurement of a reference signal.

In Example 51, the subject matter of any one of Examples 46 to 50 can optionally include wherein the second signal quality is a signal-to-interference-plus-noise ratio (SINR).

In Example 52, the subject matter of any one of Examples 37 to 51 can optionally include wherein the reference signal is a Channel State Information Reference Signal (CSI-RS).

In Example 53, the subject matter of any one of Examples 37 to 52 can optionally include wherein the reference signal is received within an orthogonal frequency-division multiplexing (OFDM) symbol.

In Example 54, the subject matter of any one of Examples 37 to 53 can optionally include wherein a receive configuration corresponds to a set of phase shifts, each of which is applied to one of at least two antennas included in a phased array of antennas for signal reception.

The subject matter of Example 55 is a communication method for a terminal device including: receiving at least one reference signal from at least one base station; switching between at least two receive configurations during a reception period of the at least one reference signal; converting the reference signal received in the time domain into a frequency domain reference signal; applying a filtering function to the converted reference signal to generate a respective contribution of the reference signal received with a corresponding one of the at least two receive configurations.

In Example 56, the subject matter of Example 55 can optionally include wherein a receive configuration is a receive configuration of at least two antennas of the terminal device.

In Example 57, the subject matter of any one of Examples 55 or 56 can optionally include wherein a receive configuration corresponds to a hypothetical direction of a received signal.

In Example 58, the subject matter of any one of Examples 55 to 57 can optionally include wherein a receive configuration corresponds to a set of phase shifts, each of which is applied to one of at least two antennas of the terminal device for signal reception.

In Example 59, the subject matter of any one of Examples 55 to 58 can optionally include further including selectively enabling or disabling each of a plurality of receive antennas included in an antenna array of the terminal device, a receive configuration corresponding to a combination of enabled and/or disabled receive antennas.

In Example 60, the subject matter of any one of Examples 55 to 59 can optionally include further including switching between at least two of the receive configurations during a reception period of a single reference signal.

In Example 61, the subject matter of any one of Examples 55 to 60 can optionally include wherein the filtering function is a finite impulse response (FIR) filtering function applied in the frequency domain.

In Example 62, the subject matter of any one of Examples 55 to 61 can optionally include further including determining a parameter indicative of a first signal quality of the received reference signal for each receive configuration.

In Example 63, the subject matter of Example 62 can optionally include wherein the parameter indicative of the first signal quality of the received reference signal is a received power of the reference signal.

In Example 64, the subject matter of any one of Examples 55 to 63 can optionally include further including adjusting a time period during which the at least one reference signal is received with a respective receive configuration based on a second signal quality of the reference signal received with the respective receive configuration.

In Example 65, the subject matter of Example 64 can optionally include further including adjusting the time period during which the at least one reference signal is received with a respective receive configuration to be shorter for a higher second signal quality.

In Example 66, the subject matter of any one of Examples 55 to 63 can optionally include further including switching between receive configurations included in a predefined group of receive configurations, and excluding a respective receive configuration from said group, when a second signal quality of the reference signal received with the respective receive configuration is below a predefined threshold.

In Example 67, the subject matter of Example 66 can optionally include further including switching between the receive configurations included in the predefined group during a sweeping period, and excluding the respective receive configuration for a predetermined number of sweeping periods.

In Example 68, the subject matter of any one of Examples 64 to 67 can optionally include wherein the second signal quality is a signal quality of the reference signal received with the respective receive configuration in at least one previous measurement of a reference signal.

In Example 69, the subject matter of any one of Examples 64 to 68 can optionally include wherein the second signal quality is a signal-to-interference-plus-noise ratio (SINR).

In Example 70, the subject matter of any one of Examples 55 to 69 can optionally include wherein the reference signal is a Channel State Information Reference Signal (CSI-RS).

In Example 71, the subject matter of any one of Examples 55 to 70 can optionally include wherein the reference signal is received within an orthogonal frequency-division multiplexing (OFDM) symbol.

In Example 72, the subject matter of any one of Examples 55 to 71 can optionally include wherein a receive configuration corresponds to a set of phase shifts, each of which is applied to one of at least two antennas included in a phased array of antennas for signal reception.

The subject matter of Example 73 is a communication device including: at least two receive antennas and one of more processors configured to: receive at least one reference signal of a plurality of reference signals, each reference signal being transmitted from at least one base station at a predefined reference signal transmission time; switch between at least two receive configurations of the at least two antennas during a reception period of the at least one reference signal; and determine a parameter indicative of a first signal quality of the received reference signal for each receive configuration.

In Example 74, the subject matter of Example 73 can optionally include wherein a receive configuration corresponds to a hypothetical direction of a received signal.

In Example 75, the subject matter of any one of Examples 73 or 74 can optionally include wherein a receive configuration corresponds to a set of phase shifts, each of which is applied to one of the at least two antennas for signal reception.

In Example 76, the subject matter of any one of Examples 73 to 75 can optionally include wherein the communication device includes an antenna array with a plurality of receive antennas, the one or more processors being configured to selectively enable or disable each of the antennas, wherein a receive configuration corresponds to a combination of enabled and/or disabled receive antennas.

In Example 77, the subject matter of any one of Examples 73 to 76 can optionally include wherein the one or more processors are configured to switch between at least two of the receive configurations during a reception period of a single reference signal.

In Example 78, the subject matter of any one of Examples 73 to 77 can optionally include wherein the parameter indicative of the first signal quality of the received reference signal is a received power of the reference signal.

In Example 79, the subject matter of any one of Examples 73 to 78 can optionally include wherein the one or more processors are further configured to apply a filtering function to the received reference signal to generate a respective contribution of the reference signal received with a corresponding one of the at least two receive configurations of the at least two antennas.

In Example 80, the subject matter of Example 79 can optionally include wherein the one or more processors are further configured to convert the reference signal received in the time domain into a frequency domain reference signal, wherein the one or more processors are configured to apply the filtering function to the frequency domain reference signal.

In Example 81, the subject matter of any one of Examples 79 to 80 can optionally include wherein the filtering function is a finite impulse response (FIR) filtering function applied in the frequency domain.

In Example 82, the subject matter of any one of Examples 73 to 81 can optionally include wherein the one or more processors are configured to adjust a time period during which the at least one reference signal is received with a respective receive configuration based on a second signal quality of the reference signal received with the respective receive configuration.

In Example 83, the subject matter of Example 82 can optionally include wherein the one or more processors are configured to adjust the time period during which the at least one reference signal is received with a respective receive configuration to be shorter for a higher second signal quality.

In Example 84, the subject matter of any one of Examples 73 to 81 can optionally include wherein the one or more processors are configured to switch between receive configurations included in a predefined group of receive configurations, wherein the one or more processors are configured to exclude a respective receive configuration from said group, when a second signal quality of the reference signal received with the respective receive configuration is below a predefined threshold.

In Example 85, the subject matter of Example 84 can optionally include wherein the one or more processors are configured to switch between the receive configurations included in the predefined group during a sweeping period, and wherein the one or more processors are configured to exclude the respective receive configuration for a predetermined number of sweeping periods.

In Example 86, the subject matter of any one of Examples 82 to 85 can optionally include wherein the second signal quality is a signal quality of the reference signal received with the respective receive configuration in at least one previous measurement of a reference signal.

In Example 87, the subject matter of any one of Examples 82 to 86 can optionally include wherein the second signal quality is a signal-to-interference-plus-noise ratio (SINR).

In Example 88, the subject matter of any one of Examples 73 to 87 can optionally include wherein the reference signal is a Channel State Information Reference Signal (CST-RS).

In Example 89, the subject matter of any one of Examples 73 to 88 can optionally include wherein the reference signal is received within an orthogonal frequency-division multiplexing (OFDM) symbol.

In Example 90, the subject matter of any one of Examples 73 to 89 can optionally include wherein the at least two receive antennas form a phased array, and wherein a receive configuration corresponds to a set of phase shifts, each of which is applied to one of the at least two antennas for signal reception.

The subject matter of Example 91 is a terminal device including: one or more processors configured to: receive at least one reference signal from at least one base station; switch between at least two receive configurations during a reception period of the at least one reference signal; transform the reference signal received in the time domain into a frequency domain reference signal; apply a filtering function to the converted reference signal to generate a respective contribution of the reference signal received with a corresponding one of the at least two receive configurations.

In Example 92, the subject matter of Example 91 can optionally include wherein the terminal device includes at least two receive antennas, and wherein a receive configuration is a receive configuration of the at least two antennas.

In Example 93, the subject matter of any one of Examples 91 to 92 can optionally include wherein a receive configuration corresponds to a hypothetical direction of a received signal.

In Example 94, the subject matter of any one of Examples 91 to 93 can optionally include wherein a receive configuration corresponds to a set of phase shifts, each of which is applied to one of the at least two antennas for signal reception.

In Example 95, the subject matter of any one of Examples 91 to 94 can optionally include wherein the terminal device includes an antenna array with a plurality of receive antennas, the one or more processors being configured to selectively enable or disable each of the antennas, wherein a receive configuration corresponds to a combination of enabled and/or disabled receive antennas.

In Example 96, the subject matter of any one of Examples 91 to 95 can optionally include wherein the one or more processors are configured to switch between at least two of the receive configurations during a reception period of a single reference signal.

In Example 97, the subject matter of any one of Examples 91 to 96 can optionally include wherein the filtering function is a finite impulse response (FIR) filtering function applied in the frequency domain.

In Example 98, the subject matter of any one of Examples 91 to 97 can optionally include wherein the one or more processors are further configured to determine a parameter indicative of a first signal quality of the received reference signal for each receive configuration.

In Example 99, the subject matter of Example 98 can optionally include wherein the parameter indicative of the first signal quality of the received reference signal is a received power of the reference signal.

In Example 100, the subject matter of any one of Examples 91 to 99 can optionally include wherein the one or more processors are configured to adjust a time period during which the at least one reference signal is received with a respective receive configuration based on a second signal quality of the reference signal received with the respective receive configuration.

In Example 101, the subject matter of Example 100 can optionally include wherein the one or more processors are configured to adjust the time period during which the at least one reference signal is received with a respective receive configuration to be shorter for a higher second signal quality.

In Example 102, the subject matter of any one of Examples 91 to 99 can optionally include wherein the one or more processors are configured to switch between receive configurations included in a predefined group of receive configurations, wherein the one or more processors are configured to exclude a respective receive configuration from said group, when a second signal quality of the reference signal received with the respective receive configuration is below a predefined threshold.

In Example 103, the subject matter of Example 102 can optionally include wherein the one or more processors are configured to switch between the receive configurations included in the predefined group during a sweeping period, and wherein the one or more processors are configured to exclude the respective receive configuration for a predetermined number of sweeping periods.

In Example 104, the subject matter of any one of Examples 100 to 103 can optionally include wherein the second signal quality is a signal quality of the reference signal received with the respective receive configuration in at least one previous measurement of a reference signal.

In Example 105, the subject matter of any one of Examples 100 to 104 can optionally include wherein the second signal quality is a signal-to-interference-plus-noise ratio (SINR).

In Example 106, the subject matter of any one of Examples 91 to 105 can optionally include wherein the reference signal is a Channel State Information Reference Signal (CSI-RS).

In Example 107, the subject matter of any one of Examples 91 to 106 can optionally include wherein the reference signal is received within an orthogonal frequency-division multiplexing (OFDM) symbol.

In Example 108, the subject matter of any one of Examples 91 to 107 can optionally include wherein the at least two receive antennas form a phased array, and wherein a receive configuration corresponds to a set of phase shifts, each of which is applied to one of the at least two antennas for signal reception.

What is claimed is:

1. A device comprising:
   a receiver comprising a plurality of antennas configured to receive a reference signal;
   a controller configured to
      switch between multiple receive configurations of the plurality of antennas within a reception period of the reference signal, and
      skip, based on a signal quality value of a previously received reference signal, selected one or more receive configurations of the multiple receive configurations when switching between the multiple receive configurations; and
   a signal quality determining circuit configured to determine a signal quality value of the reference signal for each receive configuration of the multiple receive configurations that is not skipped.

2. The device of claim 1,
   wherein a receive configuration corresponds to a hypothetical direction of a received signal.

3. The device of claim 1,
   wherein the plurality of antennas forms a phased array, wherein a receive configuration corresponds to a set of phase shifts, and wherein each phase shift of the set of phase shifts is applied to one of the plurality of antennas for signal reception.

4. The device of claim 1,
   wherein the controller is further configured to selectively enable and disable one or more of the plurality of antennas, wherein a receive configuration of the multiple receive configurations corresponds to one of:
   a combination of enabled and disabled antennas of the plurality of antennas; or
   a combination of enabled antennas of the plurality of antennas.

5. The device of claim 1,
   wherein the reference signal is one of a plurality of reference signals, wherein each reference signal of the plurality of reference signals is transmitted from at least one base station at a corresponding predefined reference signal transmission time.

6. The device of claim 1,
   wherein the signal quality value of the reference signal is a received power of the reference signal.

7. The device of claim 1, further comprising:
   a filter circuit configured to apply a filtering function to the reference signal to keep a respective power contribution of the reference signal, wherein the respective power contribution corresponds to a receive configuration of the multiple receive configurations.

8. The device of claim 7, further comprising:
   a transformer configured to convert the reference signal into a frequency domain reference signal, wherein the filter circuit is configured to apply the filtering function to the frequency domain reference signal.

9. The device of claim 7,
   wherein the filtering function is a finite impulse response (FIR) filtering function applied in the frequency domain.

10. The device of claim 1,
wherein the controller is configured to adjust a time period during which a reference signal is received using a corresponding receive configuration of the multiple receive configurations, based on a signal quality value of another reference signal previously received using the corresponding receive configuration.

11. The device of claim 10,
wherein the controller is configured to adjust the time period to be shorter when the signal quality value of the other reference signal is higher than a specified value.

12. The device of claim 1,
wherein the controller is configured to skip the one or more receive configurations responsive to a signal quality value of the previously received reference signal being below a predefined threshold value.

13. The device of claim 1,
wherein the previously received reference signal is received within a previous reception period using one of the selected one or more receive configurations.

14. A terminal device comprising:
a receiver configured to receive a reference signal via a phased antenna array from a base station;
a controller configured to
 switch between multiple receive configurations of the phased antenna array within a reception period of the reference signal, and
 skip, based on a signal quality value of a previously received reference signal, selected one or more receive configurations of the multiple receive configurations when switching between the multiple receive configurations;
a transformer configured to convert the reference signal into a frequency domain reference signal; and
a filter circuit configured to apply a corresponding filtering function to the frequency domain reference signal for each respective receive configuration of the multiple receive configurations that is not skipped, to identify a respective power contributed to the reference signal when using the respective receive configuration.

15. The terminal device of claim 14, wherein a receive configuration corresponds to at least one of:
a hypothetical direction of a received signal; or
a set of phase shifts, wherein each phase shift of the set of phase shifts is applied to an antenna of the phased antenna array for signal reception.

16. The terminal device of claim 14, wherein the controller is configured to selectively enable and disable one or more antennas of the phased antenna array, and wherein a receive configuration corresponds to one of:
a combination of enabled antennas; or
a combination of enabled and disabled antennas.

17. The terminal device of claim 14,
wherein the controller is configured to switch between the multiple receive configurations during reception of a plurality of reference signals.

18. A wireless communication device comprising:
a phased antenna array comprising a plurality of antennas and configured to receive a plurality of receive signals;
a controller configured to
 switch between multiple receive configurations of the phased antenna array within a reception period of a single reference signal of the plurality of reference signals, and
 skip selected one or more receive configurations of the multiple receive configurations when switching between the multiple receive configurations, when a signal quality value of another reference signal previously received using a receive configuration included in the one or more receive configurations is below a predefined threshold value; and
a signal quality determining circuit configured to determine a signal quality value of the single reference signal for each receive configuration of the multiple receive configurations that is not skipped.

19. The wireless communication device of claim 18, wherein a receive configuration corresponds to at least one of:
a hypothetical direction of a received signal;
a set of phase shifts, wherein each phase shift of the set of phase shifts is applied to one of the plurality of antennas for signal reception; or
one of:
 a combination of antennas selectively enabled by the controller; or
 a combination of antennas selectively enabled and disabled by the controller.

20. The wireless communication device of claim 18,
wherein the controller is configured to adjust a time period during which a reference signal is received using a corresponding receive configuration of the multiple receive configurations, based on a signal quality value of another reference signal previously received using the corresponding receive configuration.

* * * * *